United States Patent [19]

Bolus et al.

[11] 4,158,214
[45] Jun. 12, 1979

[54] PROTECTIVE DEVICE FOR AN ELECTRONIC JUNCTOR

[75] Inventors: Daniel M. A. F. Bolus, Jouars-Ponchartrain; Jean-Pierre Chevillon, Plaisir; Jean-Charles Comte, Jouy-en-Josas; Pierre D. P. Philippe, Clamart, all of France

[73] Assignee: International Standard Electric Corporation, New York, N.Y.

[21] Appl. No.: 868,564

[22] Filed: Jan. 10, 1978

[30] Foreign Application Priority Data

Nov. 1, 1977 [FR] France .................. 77 00542

[51] Int. Cl.$^2$ .............................................. H02H 3/20
[52] U.S. Cl. ......................................... 361/91; 361/56
[58] Field of Search .............. 361/54, 55, 56, 89, 361/90, 91, 187; 340/662; 307/130

[56] References Cited

U.S. PATENT DOCUMENTS

| 3,243,658 | 3/1966 | Blackburn | 361/90 |
| 3,311,907 | 3/1967 | Teal | 340/662 |
| 3,537,757 | 11/1970 | Griffin | 361/90 X |

FOREIGN PATENT DOCUMENTS

| 1513198 | 10/1969 | Fed. Rep. of Germany | 361/91 |
| 1123799 | 8/1968 | United Kingdom | 361/91 |

*Primary Examiner*—Harry E. Moose, Jr.
*Attorney, Agent, or Firm*—James B. Raden; Donald J. Lenkszus

[57] ABSTRACT

A circuit for protecting a telephone junctor from excessive alternating or direct current voltage includes a diode bridge connected to the junctor. A first threshold detector connected to the diode bridge detects excessive positive voltages and a second threshold detector connected to the diode bridge detects excessive negative voltages. The output of the two threshold detectors are applied to a temporization circuit which inhibits an over-voltage indication signal from being generated by transient over-voltages. The temporization circuit also sustains an over-voltage indication signal when the signal waveform of an alternating-current over-voltage passes through zero. A circuit responsive to an over-voltage indication signal inhibits application of power to the junctor circuit.

4 Claims, 2 Drawing Figures

PROTECTIVE DEVICE FOR AN ELECTRONIC JUNCTOR

This invention concerns a device for the protection of electronic junctors in a telephone exchange.

The junctors are connected to the telephone lines which can receive, in addition to the normal supply voltage (generally −48 V), a-c or d-c over-voltages, the most probable of which being the main supply voltage (220 V, 50 Hz). These abnormal voltages, while being troublesome for relay-type junctors, are intolerable to the semiconductor components of electronic junctors.

The object of this invention precisely is a junctor protection device allowing this problem to be overcome.

According to one characteristic of the invention, the protective device includes means to automatically cut off the junctor supply in the case of a-c or d-c overvoltage between the two wires of the telephone line, or between one wire and ground.

Other characteristics and advantages of this invention will be brought out in the following description of an embodiment, the said description being related to the attached drawings in which.

Figure 1:
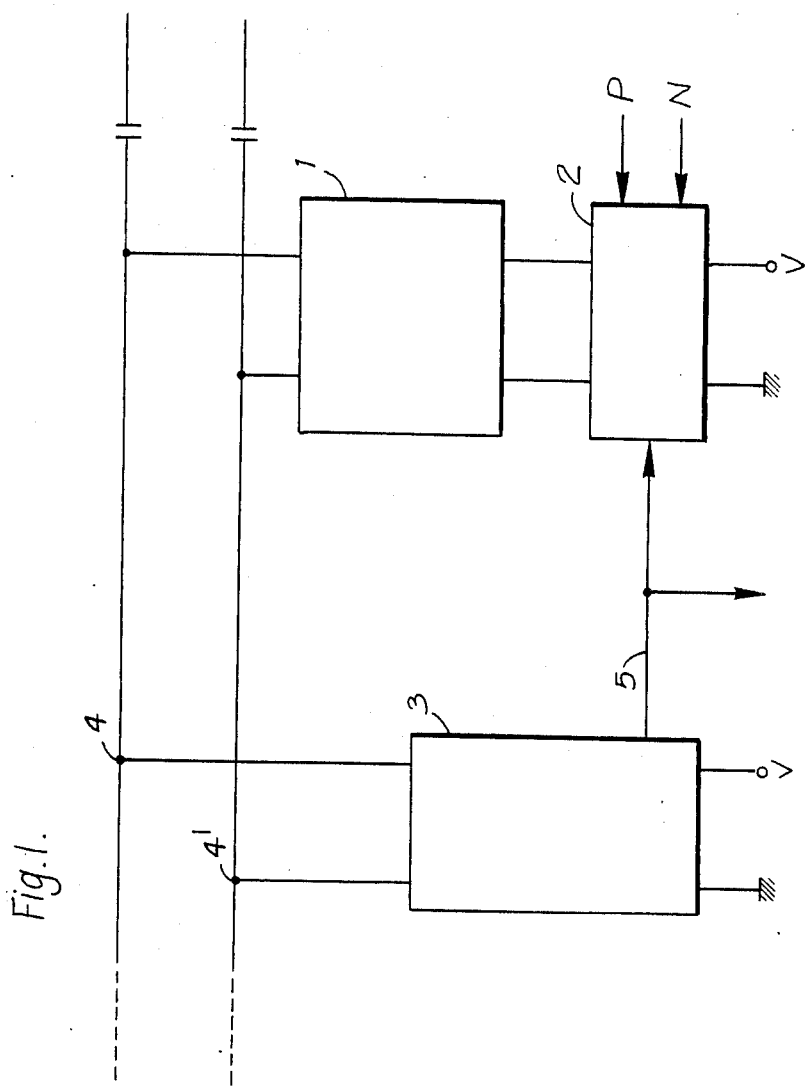
FIG. 1 shows the block diagram of a junctor containing the protective device according to the invention.

FIG. 1 shows a block diagram of a junctor containing the protective device according to the invention. The junctor includes a block of circuits 1 connected to the telephone line and performing the usual functions of a junctor, such as loop state detection, decoupling of the supply, etc. . . . Block 1 receives the line supply voltage V (usually −48 V) through a polarity reversing circuit 2 permitting the polarity of the line supply voltage to be selected as a function of control signals P and N. The protective device according to the invention, designated by the reference 3, is placed in parallel with the line, by means of connections 4 and 4', and receives the supply voltage V. The operating principle of device 3 consists in cutting off the supply at the level of the polarity reversing circuit 2 when it detects an abnormal voltage, either a-c or d-c, and in warning the centralized control unit at the exchange. This is obtained by the presence of a "false potential" signal having a zero level at an output 5 of the protective device 3.

Figure 2:
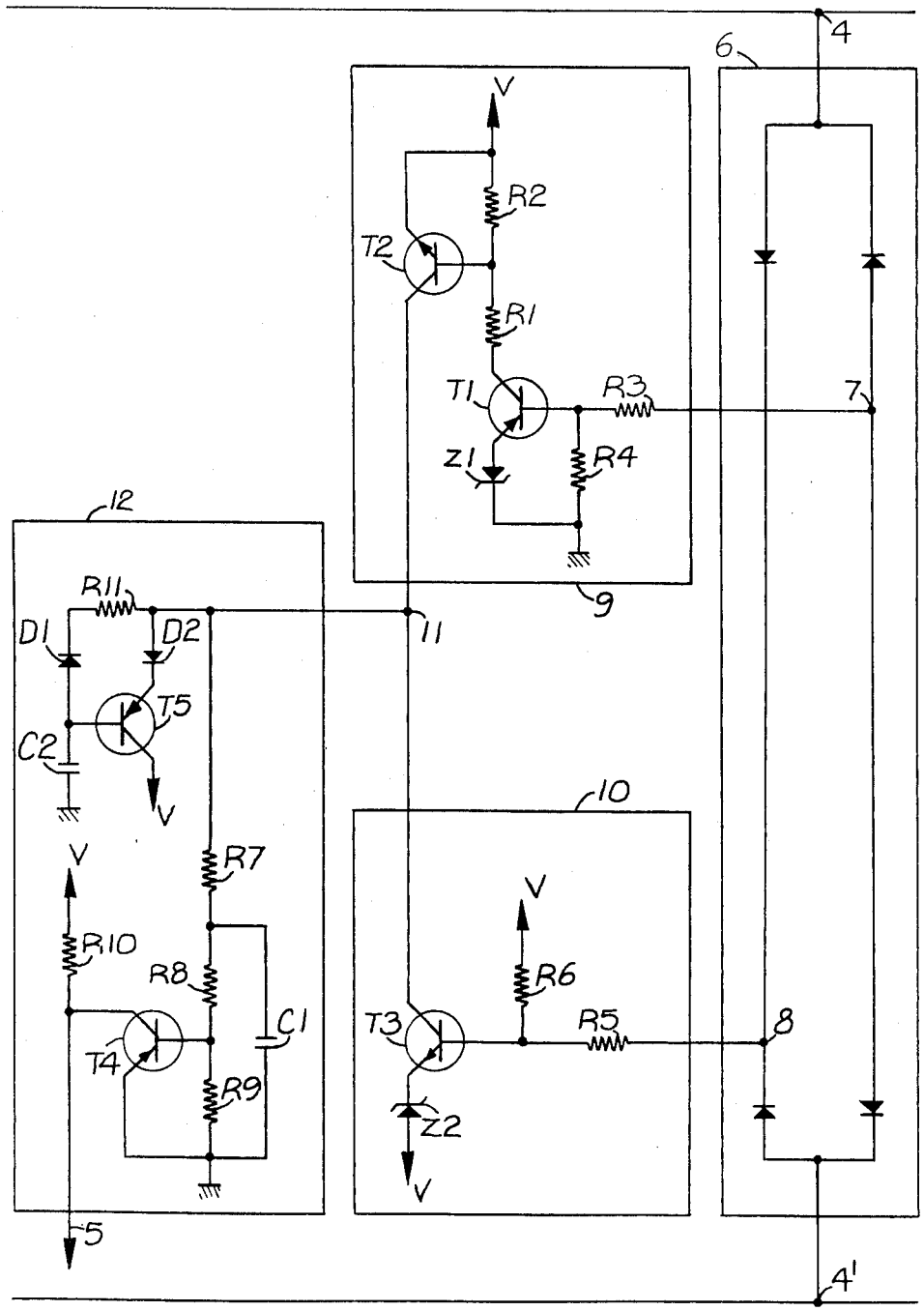
FIG. 2 is a detailed schematic diagram of an embodiment of the protective device according to the invention.

The circuit details of the protective device in accordance with the principles of the invention will now be described in connection with FIG. 2. It contains, first of all, a bridge rectifier 6 whose two inputs are connected respectively to terminals 4 and 4' of the line and whose two outputs, referenced 7 and 8, are connected respectively to the inputs of two threshold detectors 9 and 10. The bridge rectifier, making the system independent of the polarity on the two wires of the line, delivers between its outputs 7 and 8 a voltage difference V7−V8 which is always negative.

When the voltage V7 at output 7 goes sufficiently negative with respect to ground, which indicates an overvoltage, the output of the threshold detector 9 delivers the supply voltage V. Otherwise, the output presents a high impedance.

When the voltage V8 at output 8 goes sufficiently positive with respect to the supply voltage V, which also indicates an overvoltage, the output of the threshold detector 10 delivers a voltage close to the supply voltage V. Otherwise, it presents a high impedance.

The outputs of both detectors 9 and 10 are connected together at a point 11 which constitutes the input to the final stage 12. Such a connection performs the logical "OR" function. Thus, an a-c or d-c overvoltage, present between the two wires of the line or between one wire and ground, is manifested by a voltage virtually equal to V at the input of the stage 12. This stage then delivers at the output 5 a signal of level 0 indicating a "false potential". Otherwise, the voltage at the output 5 is equal to V.

The threshold detector 9 consists of a first transistor T1 of the PNP type whose emitter is connected through a Zener diode Z1 to ground and whose collector is connected to the supply voltage V through two resistors R1 and R2. The base of transistor T1 is supplied by means of a voltage divider whose a first resistor R3 receives the voltage V7 at the output 7 of the bridge rectifier 6, and whose a second resistor R4 is connected to ground. The emitter and the base of a second transistor T2 of the NPN type are connected respectively to each of the terminals of resistor R2. The collector constitutes the output of the threshold detector 9. A voltage V7 sufficiently negative with respect to ground causes transistors T1 and T2 to conduct, therefore placing the output of the threshold detector 9 at the level V.

The threshold detector 10 consists of a single NPN transistor T3 whose emitter is connected to the supply voltage V through a Zener diode Z2 and whose collector is connected to the output. The base of transistor T3 is supplied by means of a voltage divider whose a first resistor R5 receives the voltage V8 from output 8 of the bridge rectifier 6 and whose a second resistor R6 is connected to voltage V. The components Z2, R5 and R6 are identical to components Z1, R3 and R4 respectively of the threshold detector 9. A voltage V8 sufficiently positive with respect to the voltage V causes transistor T3 to conduct, thus placing the output of the threshold detector 10 at a level virtually equal to V (taking into account the Zener voltage at the terminals of diode Z2).

The final stage 12 is essentially a temporization circuit. It introduces time constants on the one hand to prevent the protective device from reacting to short transients, lasting less than 5 μs for example, and on the other hand to prevent it from releasing when a-c overvoltages pass through zero.

The time constant relating to short transients is obtained by means of three resistors R7, R8 and R9 placed between the input of stage 12 and ground, and a capacitor C1 connected between the junction of resistors R7 and R8 and ground. An PNP type transistor T4 has its emitter connected to ground, its base connected to the junction of resistors R8 and R9, and its collector connected through a resistor 10 to the supply voltage V. The collector constitutes the output 5 of the protective device. When an over-voltage is detected, transistor T4 conducts, causing a zero level to appear at output 5.

The time constant relating to a-c overvoltages is obtained by means of a capacitor C2 which is charged through a diode D1 and a resistor R11 when a voltage close to V appears at the input of stage 12 and which discharges slowly through the base-emitter circuit of transistor T5 whose collector is connected to the supply voltage V and whose emitter is connected through a diode D2 to the resistor R7.

Although this invention has been described in connection with a particular embodiment, it is clearly not limited to the said embodiment and is capable of variants or modifications still lying within its scope.

What is claimed is:

1. Apparatus for protecting a telephone junctor circuit energized by a junctor power supply from excessive alternating-current and direct-current voltages comprising:
   a bridge rectifier connected to said junctor circuit and having first and second output terminals;
   a first threshold detector connected to said first output terminal;
   a second threshold detector connected to said second output terminal;
   a temporization circuit having an input terminal and an output terminal;
   first means for connecting said first and second threshold detectors to said temporization circuit input terminal; and
   second means connected to said temporization circuit output terminal for inhibiting said junctor power supply in response to an over-voltage indication signal generated by said temporization circuit.

2. Apparatus in accordance with claim 1, wherein said temporization circuit comprises:
   a first capacitor;
   first resistive means connected between said temporization circuit input terminal and said first capacitor;
   second resistive means connected in shunt with said first resistive means;
   a second capacitor;
   circuit means connecting said second capacitor and said temporization circuit input terminal for charging said second capacitor;
   discharge means for discharging said second capacitor; and
   switch means for generating an overvoltage indication signal at said temporization circuit output terminal in response to said first capacitor being charged to a voltage equal to or greater than a predetermined voltage.

3. Apparatus in accordance with claim 2, wherein said circuit means includes a first diode and a first resistor serially connected between said temporization circuit input terminal and said second capacitor.

4. Apparatus in accordance with claim 3, wherein said discharge means comprises;
   a power supply;
   a diode connected to said temporization circuit input terminal; and
   a transistor having a first terminal connected to said second capacitor, a second terminal connected to said diode and a third terminal connected to said power supply.

* * * * *